United States Patent
Duale et al.

(10) Patent No.: US 10,021,518 B2
(45) Date of Patent: Jul. 10, 2018

(54) SMART GROUP MOBILITY POSITIONING AND SHARING

(71) Applicant: International Business Machines Corporation, Armonk, NY (US)

(72) Inventors: Ali Y. Duale, Poughkeepsie, NY (US); Shailesh R. Gami, Poughkeepsie, NY (US); Louis P. Gomes, Poughkeepsie, NY (US); Rajaram B. Krishnamurthy, Pleasant Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/232,928

(22) Filed: Aug. 10, 2016

(65) Prior Publication Data
US 2018/0048992 A1    Feb. 15, 2018

(51) Int. Cl.
*H04W 4/02* (2018.01)
*H04W 4/021* (2018.01)
*G06Q 50/00* (2012.01)

(52) U.S. Cl.
CPC ............ *H04W 4/021* (2013.01); *G06Q 50/01* (2013.01); *H04W 4/027* (2013.01)

(58) Field of Classification Search
CPC ..... H04W 4/021; H04W 4/022; H04W 4/027; H04W 4/02; H04W 4/023; H04W 4/025; G06Q 50/01; G01S 5/0294; H04L 67/22
See application file for complete search history.

(56) References Cited

U.S. PATENT DOCUMENTS

| | | | |
|---|---|---|---|
| 6,756,918 B2 | 6/2004 | Fomukong | |
| 2002/0107008 A1 | 8/2002 | Hendrey et al. | |
| 2003/0013456 A1 | 1/2003 | Bates et al. | |
| 2003/0100326 A1 | 5/2003 | Grube et al. | |
| 2008/0218405 A1* | 9/2008 | Eckhart | G01C 21/20 342/146 |
| 2008/0287143 A1 | 11/2008 | Banks et al. | |
| 2016/0005003 A1* | 1/2016 | Norris | G06Q 10/10 705/7.19 |

OTHER PUBLICATIONS

Fu, et al., "A Field Study of Run-Time Location Access Disclosures on Android Smartphones", USEC '14, Feb. 23, 2014, San Diego, CA, Copyright 2014 Internet Society, 10 pages.
"Cell Phones: Location Tracking & Sharing", Copyright 2011 National Network to End Domestic Violence, Safety Net Project, printed May 25, 2016, 4 pages, <www.nnedv.org/safetynet>.
"ENAiKOON buddy-tracker", User Manual for ENAiKOON buddy-tracker, Berlin, Sep. 24, 2009, Copyright 2003-2009 ENAiKOON GmbH, Berlin, 24 pages.

* cited by examiner

*Primary Examiner* — Thai Vu
(74) *Attorney, Agent, or Firm* — Isaac J. Gooshaw; Lance I. Hochhauser

(57) ABSTRACT

Determining an individual exceeds a time-distance from a point. Locations for a set of individuals are monitored and an alert is transmitted if an individual exceeds a time-distance from a point.

17 Claims, 4 Drawing Sheets

SMART GROUP MOBILITY POSITIONING AND SHARING

BACKGROUND

The present invention relates generally to the field of location-based services, and more particularly to positioning and sharing locations within a group.

Current geo-tracking systems focus on one device containing a location-based service. Some location-based services provide real-time directions on maps, for example, starting from a current location of a smart phone and traveling to a designated destination or following a set of running routes of a user. Other location-based services allow a user to explore nearby places, such as gas stations, restaurants, theaters, etc., based on a designated location. In addition, a user is able to share a current location of the user on a set of social networks.

SUMMARY

According to an aspect of the present invention, there is a method, computer program product, and/or system that performs the following operations (not necessarily in the following order): Identifying, by a set of processors, a set of group members. Defining, by the set of processors, a center of a time-circle. Defining, by the set of processors, a time-radius for the time-circle, characterized by a first travel time to the center. Monitoring, by the set of processors, a first set of movements corresponding to the set of group members. Updating, by the set of processors, the center based, at least in part, on the first set of movements. Determining, by the set of processors, a first subset of the set of group members are outside the time-circle. Communicating, by the set of processors, an alert, to a second subset of the set of group members, that the first subset of the set of group members are outside the time-circle.

DETAILED DESCRIPTION

Figure 1:
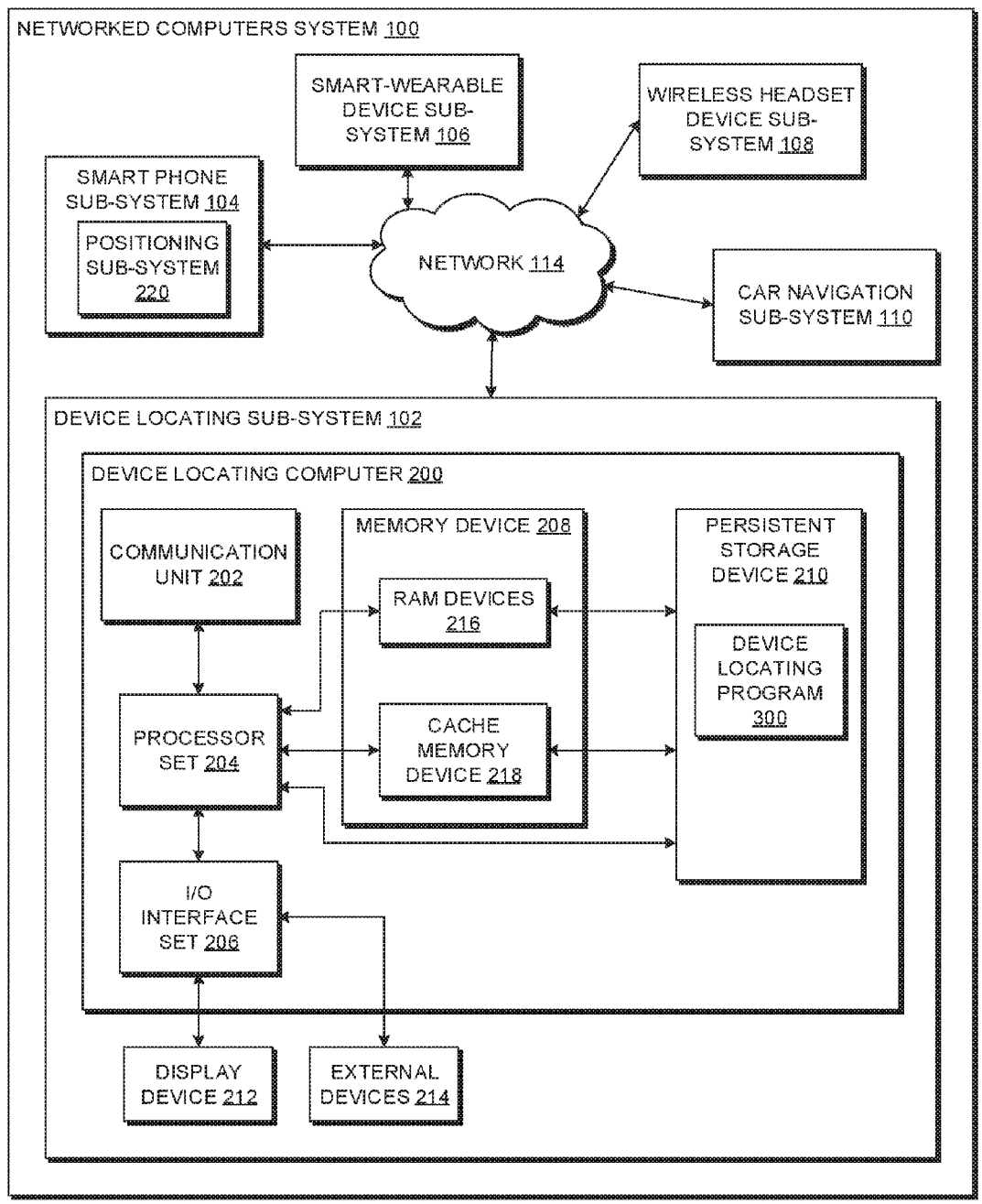
FIG. 1 is a block diagram view of a first embodiment of a system according to an embodiment of the present invention.

Determining an individual exceeds a time-distance from a point. Locations for a set of individuals are monitored and an alert is transmitted if an individual exceeds a time-distance from a point. This Detailed Description section is divided into the following sub-sections: (i) Hardware and Software Environment; (ii) Example Embodiment; (iii) Further Comments and/or Embodiments; and (iv) Definitions.

I. Hardware and Software Environment

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: device locating sub-system 102; smart phone sub-system 104; smart-wearable device sub-system 106; wireless headset device sub-system 108; car navigation sub-system 110; and communication network 114. Device locating sub-system 102 contains: device locating computer 200; display device 212; and external devices 214. Device locating computer 200 contains: communication unit 202; processor set 204; input/output (I/O) interface set 206; memory device 208; and persistent storage device 210. Memory device 208 contains: random access memory (RAM) devices 216; and cache memory device 218. Persistent storage device 210 contains: device locating program 300. Smart phone sub-system 104 contains: positioning sub-system 220.

Positioning sub-system 220 can be any system capable of determining a position for smart phone sub-system 104. In some embodiments, smart phone sub-system 104 includes a global positioning system (GPS) as positioning sub-system 220, which calculates a position of the smart phone based on a set of satellite positions. Alternatively, positioning sub-system 220 determines a position of the smart phone based on a set of locations of a set of cell towers. For example, a cellular network provider provides location services through a subscriber identity module (SIM). Further, positioning sub-system 220 determines a position of the smart phone based on a radio frequency (RF) signal. One specific type of RF signal is Wi-Fi.

Device locating sub-system 102 is, in many respects, representative of the various computer sub-systems in an embodiment of the present invention. Accordingly, several portions of device locating sub-system 102 will now be discussed in the following paragraphs.

Device locating sub-system 102 may be a laptop computer, a tablet computer, a netbook computer, a personal computer (PC), a desktop computer, a personal digital assistant (PDA), a smart phone, or any programmable electronic device capable of communicating with client sub-systems via communication network 114. Device locating program 300 is a collection of machine readable instructions and/or data that is used to create, manage, and control certain software functions that will be discussed in detail, below, in the Example Embodiment sub-section of this Detailed Description section.

Device locating sub-system 102 is capable of communicating with other computer sub-systems via communication network 114. Communication network 114 can be, for example, a local area network (LAN), a wide area network (WAN) such as the Internet, or a combination of the two, and can include wired, wireless, or fiber optic connections. In general, communication network 114 can be any combination of connections and protocols that will support communications between device locating sub-system 102 and client sub-systems.

Device locating sub-system 102 is shown as a block diagram with many double arrows. These double arrows (no separate reference numerals) represent a communications fabric, which provides communications between various components of device locating sub-system 102. This communications fabric can be implemented with any architecture designed for passing data and/or control information between processors (such as microprocessors, communications processors, and/or network processors, etc.), system memory, peripheral devices, and any other hardware components within a system. For example, the communications fabric can be implemented, at least in part, with one or more buses.

Memory device 208 and persistent storage device 210 are computer readable storage media. In general, memory device 208 can include any suitable volatile or non-volatile computer readable storage media. It is further noted that, now and/or in the near future: (i) external devices 214 may be able to supply some, or all, memory for device locating sub-system 102; and/or (ii) devices external to device locating sub-system 102 may be able to provide memory for device locating sub-system 102.

Device locating program 300 is stored in persistent storage device 210 for access and/or execution by one or more processors of processor set 204, usually through memory device 208. Persistent storage device 210: (i) is at least more persistent than a signal in transit; (ii) stores the program (including its soft logic and/or data) on a tangible medium (such as magnetic or optical domains); and (iii) is substantially less persistent than permanent storage. Alternatively, data storage may be more persistent and/or permanent than the type of storage provided by persistent storage device 210.

Device locating program 300 may include both substantive data (that is, the type of data stored in a database) and/or machine readable and performable instructions. In this particular embodiment (i.e., FIG. 1), persistent storage device 210 includes a magnetic hard disk drive. To name some possible variations, persistent storage device 210 may include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage device 210 may also be removable. For example, a removable hard drive may be used for persistent storage device 210. Other examples include optical and magnetic disks, thumb drives, and smart cards that are inserted into a drive for transfer onto another computer readable storage medium that is also part of persistent storage device 210.

Communication unit 202, in these examples, provides for communications with other data processing systems or devices external to device locating sub-system 102. In these examples, communication unit 202 includes one or more network interface cards. Communication unit 202 may provide communications through the use of either or both physical and wireless communications links. Any software modules discussed herein may be downloaded to a persistent storage device (such as persistent storage device 210) through a communications unit (such as communication unit 202).

I/O interface set 206 allows for input and output of data with other devices that may be connected locally in data communication with device locating computer 200. For example, I/O interface set 206 provides a connection to external devices 214. External devices 214 will typically include devices, such as a keyboard, a keypad, a touch screen, and/or some other suitable input device. External devices 214 can also include portable computer readable storage media, such as, for example, thumb drives, portable optical or magnetic disks, and memory cards. Software and data used to practice embodiments of the present invention (e.g., device locating program 300) can be stored on such portable computer readable storage media. In these embodiments, the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus, the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
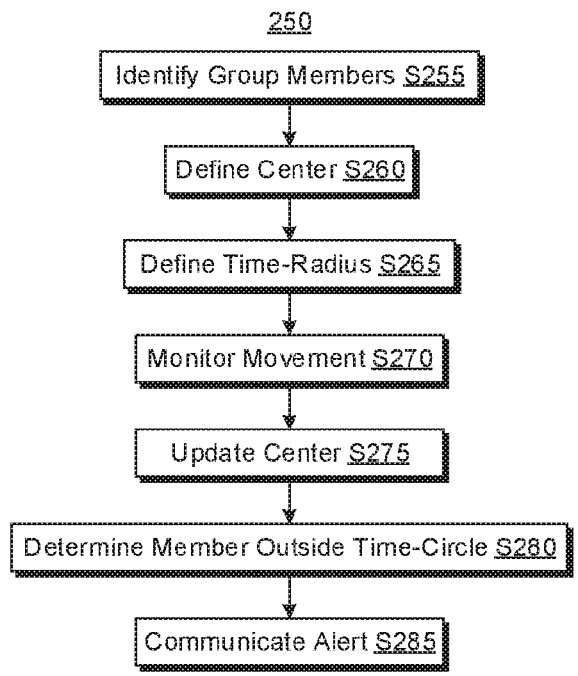
FIG. 2 is a flowchart, showing a first embodiment method performed, at least in part, by the first embodiment system.
Figure 3:
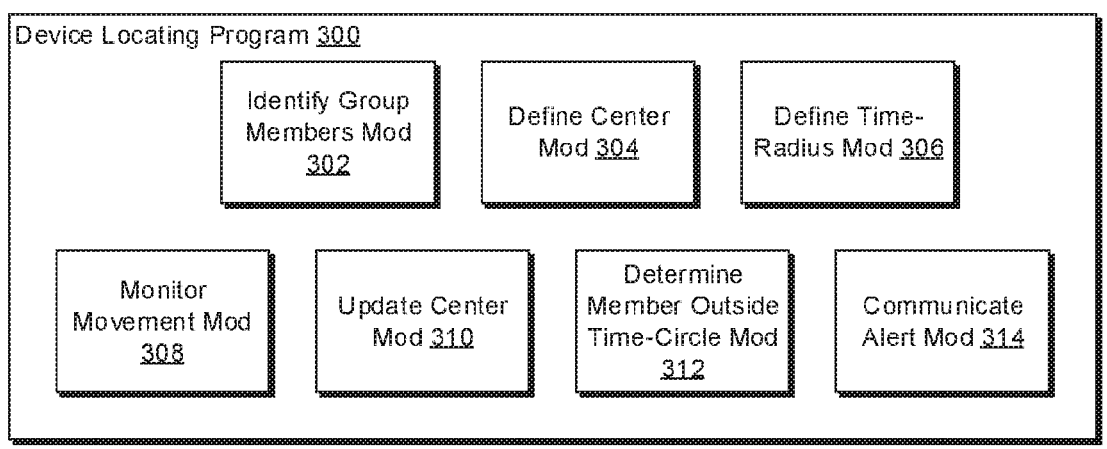
FIG. 3 is a block diagram view of a machine logic (e.g., software) portion of the first embodiment system.

FIG. 2 shows flowchart 250 depicting a method according to an embodiment of the present invention. FIG. 3 shows device locating program 300, which performs at least some of the method operations of flowchart 250. This method and associated software will now be discussed, over the course of the following paragraphs, with extensive reference to FIG. 2 (for the method operation blocks) and FIG. 3 (for the software blocks). In this example, John is traveling in New York City with three friends. The method steps presented below are described from the perspective of device locating sub-system 102.

Processing begins at operation S255, where identify group members module ("mod") 302 identifies a set of group members. In this example, each of John and his three friends carries a smart phone that contains a GPS. In some embodiments of the present invention, a group member carries various devices containing location-based services. Such devices include, but are not limited to, smart watches, smart glasses, fitness trackers, and/or wireless headsets. In other embodiments, a group member drives a car that contains a navigation system. Identifying a set of group members is sometimes also called registering a set of group members and/or incorporating a set of group members. In some embodiments, identify group members mod 302 registers a set of group members by receiving information from each group member. In other embodiments, identify group members mod 302 registers a set of group members by pairing a first device with a second device. Examples of how identify group members mod 302 identifies group members include using: (i) a radio frequency network; (ii) a near field communication network; (iii) a wireless network; and/or (iv) a wired network.

Processing proceeds to operation S260, where define center mod 304 defines a center of a time-circle. In some embodiments, define center mod 304 selects a group leader and defines a center as a location of the group leader. In some examples, define center mod 304 defines a center as a location that moves as a group leader moves. In other embodiments, define center mod 304 defines a center as a central point among a group based on a location distribution of the group. In some examples, define center mod 304 defines a center as a location that moves as a location distribution of a group moves. In further embodiments, define center mod 304 defines a center as a fixed location. In some examples, define center mod 304 defines a center as a fixed location for a meeting place. In this example, define center mod 304 defines a center for the group of John and his three friends. Here, define center mod 304 selects John as a group leader and defines the center as John's location. In some embodiments, define center mod 304 defines a center for a set of group members identified in operation S255.

Processing proceeds to operation S265, where define time-radius mod 306 defines a time-radius for a group. In some embodiments of the present invention, define time-radius mod 306 defines a time-radius of a time-circle within which group members should remain. In other embodiments, define time-radius mod 306 defines a time-radius as variable. In this example, one of John's friends, Adam, requests to increase the time-radius to further explore the city. Here, define time-radius mod 306 receives the request from Adam and enlarges the time-radius from 5 minutes to 10 minutes. In further embodiments, define time-radius mod 306 defines a time-radius to decrease as a function of time. For example, John and his three friends want to meet at a restaurant for dinner at 6:00 p.m. Here, define time-radius mod 306 defines a time-radius of 30 minutes at 5:30 p.m. and decreases the time-radius as a function of time until the time-radius reduces to zero minutes at 6:00 p.m.

In some embodiments of the present invention, a time-radius is a travel time to reach a center of a time-circle. A time-radius is a distance measurement expressed in units of time. A time-radius varies based, at least in part, on a mode of travel (e.g., walking, driving) and congestion along a route. In some examples, a time radius from a point for an individual driving a car is less than a time radius from the same point for an individual walking. In other examples, a time radius is based on one mode of travel (for example, walking), and subsequently changes upon changing to another mode of travel (for example, driving). In further examples, a time radius is based on a current route situation, and subsequently increases upon encountering a traffic congestion. In some embodiments, a time-circle is expressed on a map as an irregular shape. Such irregular shape is representative of an abstract shape with a time-radius of equal travel time. In some embodiments, the relationship between a travel time and a linear distance is as follows:

$$d(R_t, v_{avg}) = R_t \times v_{avg} \quad (1)$$

$$v_{avg} = f(env) \quad (2)$$

Here, d is a linear distance; $R_t$ is a time-radius characterized by a travel time at time t; $v_{avg}$ is an average travel speed; and env is an environment that a group member encounters while traveling. Formula (1) represents a calculation of a linear distance, d, which is a product of the time-radius, $R_t$, and the average travel speed, $v_{avg}$. Formula (2) represents a calculation of an average travel speed, $v_{avg}$, which is a function of the environment, env.

In some embodiments, define time-radius mod 306 defines a time-radius based, at least in part, on a set of geographic separations. Examples of geographic separations include, but are not limited to, rivers, lakes, mountains, and/or traffic conditions. In some embodiments, a calculated travel time between two points is disproportionate to a linear distance between the two points. For example, two cars are traveling on two roads that meet, but do not intersect (e.g., an overpass/underpass). When the two cars approach the overpass/underpass, a linear distance between the two cars is significantly less than a travel time between the two cars. In some embodiments, define time-radius mod 306 defines a time-radius for a center of a time-circle defined in operation S260.

Processing proceeds to operation S270, where monitor movement mod 308 monitors a set of movements of a set of group members. In some embodiments of the present invention, monitor movement mod 308 monitors a set of movements corresponding to a set of group members. A set of movements can include, but is not limited to, a set of real-time locations, a set of traveling speeds, a set of traveling directions, and/or a set of surrounding environments. In this example, monitor movement mod 308 monitors a set of movements for John and his three friends. Here, monitor movement mod 308 monitors the set of movements as John and his three friends walk around the city. In some embodiments, monitor movement mod 308 monitors a set of movements using a positioning system. In some of these embodiments, monitor movement mod 308 monitors a set of movements using positioning sub-system 220. In other embodiments, monitor movement mod 308 monitors a set of movements of the set of group members identified in operation S255.

Processing proceeds to operation S275, where update center mod 310 updates a center. In some embodiments of the present invention, update center mod 310 updates a center in real time. In other embodiments of the present invention, update center mod 310 updates a center continuously. In further embodiments, update center mod 310 updates a center on a delay. In some embodiments, update center mod 310 updates a center to be a location of a group leader. In other embodiments, update center mod 310 updates a center as a central point among a group based on a location distribution of the group. In alternative embodiments, update center mod 310 updates a center based on a set of movements of a set of group members. In some embodiments, update center mod 310 also updates a time-radius. In this example, update center mod 310 updates the center for John and his three friends based on John's location. In some embodiments, update center mod 310 updates the center defined in operation S260 based on a set of movements monitored in operation S270.

Processing proceeds to operation S280, where determine member outside time-circle mod 312 determines that a group member is outside a time-circle. In some embodiments, determine member outside time-circle mod 312 compares a travel time of a group member from a location of the group member to a center with a time-radius to determine that the group member is outside a time-circle. For determine member outside time-circle mod 312 to determine that a group member is outside a time-circle, a travel time for the group member to a center is greater than a time-radius. In some embodiments, determine member outside time-circle mod 312 determines a mode of transportation for a group member. In some of these embodiments, determine member outside time-circle mod 312 uses a mode of transportation for a group member to determine a travel time for the group member. In this example, Adam, John's friend, stayed in Times Square to explore and take pictures while John and the other two friends continued walking around the city. Here, determine member outside time-circle mod 312 determines that Adam is a 12 minute travel time from John, which exceeds the 10 minute time-radius defined in operation S265. In some embodiments, determine member outside time-circle mod 312 determines that a group member identified in operation S255 is outside the time-circle updated in operation S275. In an alternative example, John and his three friends are meeting at a restaurant at 6:00 p.m., as described in operation S265. Here, Adam is caught in traffic at 5:30 p.m. and while he is in traffic the time radius moves past Adam's location. Then, determine member outside time-circle mod 312 determines that Adam is outside the time-circle.

Processing terminates at operation S285, where communicate alert mod 314 communicates an alert to a subset of a set of the group members. In some embodiments, communicate alert mod 314 communicates an alert to a group leader. In other embodiments, communicate alert mod 314 communicates an alert to a subset of a set of group members. In some of these embodiments, communicate alert mod 314 communicates an alert to a subset of a set of group members wherein the subset of the set of group members is outside the time-circle. In other embodiments, communicate alert mod 314 communicates an alert to a subset of a set of group members wherein the subset of the set of group members is within the time-circle. In further embodiments, communicate alert mod 314 communicates an alert at repeated intervals to reenter a time-circle. In alternative embodiments, communicate alert mod 314 communicates an alert at intervals to a subset of a set of group members is outside a time-circle. Alternatively, communicate alert mod 314 communicates an alert at intervals to wait for a subset of a set of group members to reenter to a time-circle. In this example, communicate alert mod 314 communicates an alert at intervals to John and Adam that Adam is outside the time-circle. In an alternative example, communicate alert mod 314 communicates an alert at intervals to John and his two other friends that Adam is outside the time-circle, as determined in operation S280. In such an example, communicate alert mod 314 communicates an alert at intervals to John and his two other friends to wait for Adam to reenter the time-circle.

III. Further Comments and/or Embodiments

Some embodiments of the present invention recognize the following facts, potential problems, and/or potential areas for improvement with respect to the current state of the art: (i) location-based services are generally focused on locating a device to direct the device on a map and/or follow a route; (ii) a user may lose physical contact with other individuals not in close proximity; (iii) a linear distance measurement between a user and destination may not describe a travel time from a current location of the user to the destination.

Figure 4A:
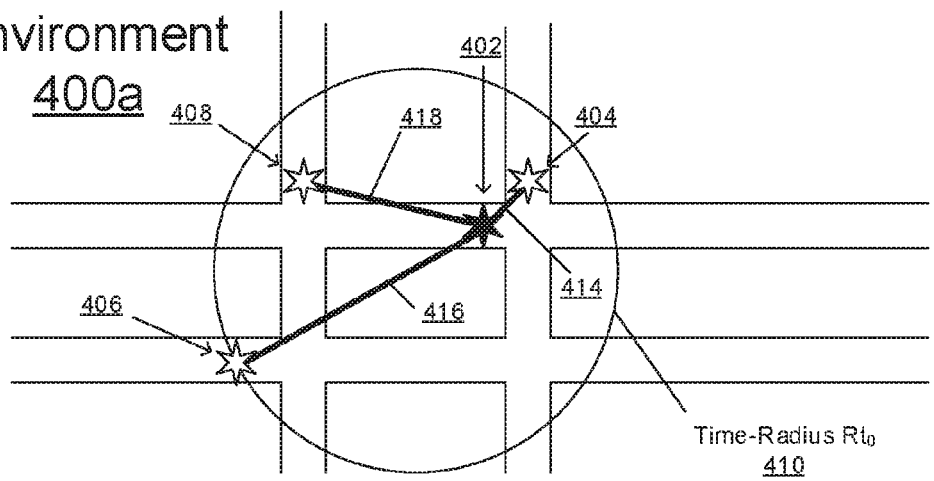
FIGS. 4A and 4B are screenshots of a free movement environment according to a second embodiment system of an embodiment of the present invention.

FIG. 4A depicts a screenshot of free movement environment 400a. Free movement environment 400a includes: group leader 402; group member 404; group member 406; group member 408; and time-radius $Rt_0$ 410. In free movement environment 400a, group leader 402, group member 404, group member 406, and group member 408 move freely inside a time-circle defined by time-radius $Rt_0$ 410. In free movement environment 400a, a device locating sub-system selects group leader 402 as a group leader. A device locating sub-system defines a center of a time-circle as a location of group leader 402. This center moves as group leader 402 moves.

Time-radius $Rt_0$ 410 is a time-radius at a time, $t_0$. At time $t_0$, if a travel time from a group member to group leader 402 is less than or equal to time-radius $Rt_0$ 410, that group member is within the time-circle. At time $t_0$, the travel time from group member 404 to group leader 402 is travel time distance 414; the travel time from group member 406 to group leader 402 is travel time distance 416; the travel time from group member 408 to group leader 402 is travel time distance 418. Because the center is defined as the location of group leader 402, the travel time for group leader 402 reduces to zero minutes. In free movement environment 400a, at time $t_0$, each of group leader 402, group member 404, group member 406, and group member 408 are within time-radius $Rt_0$ 410. Travel time distance 416 is equivalent to time-radius $Rt_0$ 410, meaning that group member 406 cannot move further away from group leader 402 and remain within the time-circle.

Figure 4B:
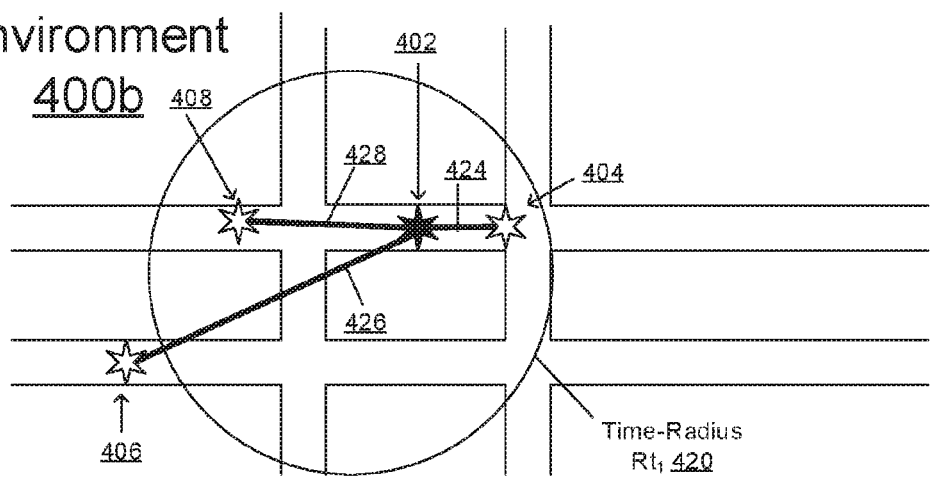

FIG. 4B depicts a screenshot of free movement environment 400b. Free movement environment 400b includes: group leader 402; group member 404; group member 406; group member 408; and time-radius $Rt_1$ 420. Free movement environment 400b is at a subsequent time, $t_1$, with respect to free movement environment 400a. Group leader 402, group member 404, group member 406, and group member 408 have moved from their respective positions in free movement environment 400a. In free movement environment 400b, group leader 402, group member 404, group member 406, and group member 408 move freely inside a time-circle defined by time-radius $Rt_1$ 420.

In free movement environment 400b, a device locating sub-system monitors a set of movements for group leader 402, group member 404, group member 406, and group member 408. The device locating sub-system also updates a center, which is based on a location of group leader 402. The device locating sub-system also determines if any group members are outside time-radius $Rt_1$ 420. At time $t_1$, the travel time from group member 404 to group leader 402 is travel time distance 424; the travel time from group member 406 to group leader 402 is travel time distance 426; the travel time from group member 408 to group leader 402 is travel time distance 428. In free movement environment 400b, at time $t_1$, each of group leader 402, group member 404, and group member 408 are within time-radius $Rt_1$ 420. However, group member 406 is not within time-radius $Rt_1$ 420. Travel time distance 416 is greater than time-radius $Rt_1$ 420. The device locating sub-system then communicates an alert at repeated intervals to group leader 402 and group member 406 that group member 406 is outside the time-circle and should move closer to the center.

Figure 5A:
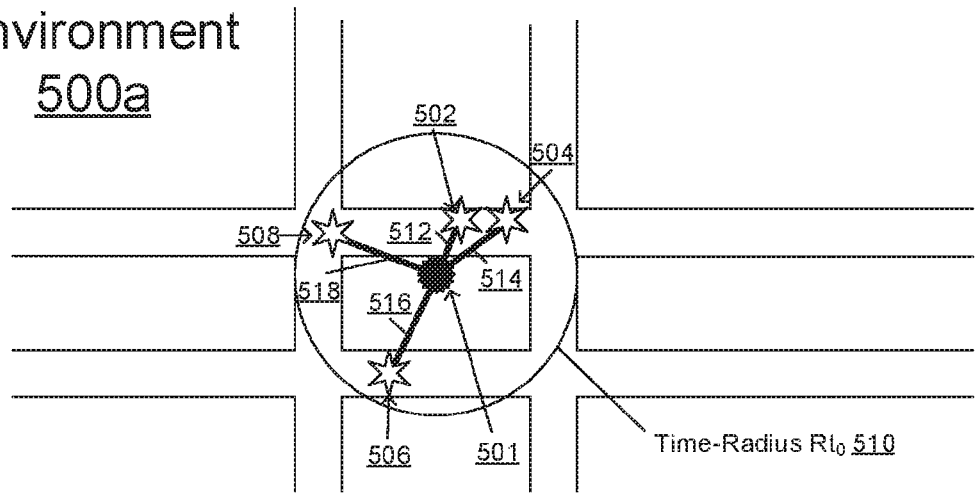
FIGS. 5A and 5B are screenshots of a time lapse environment according to the second embodiment system of an embodiment of the present invention.

FIG. 5A depicts a screenshot of time lapse environment 500a. Time lapse environment 500a includes: meeting place 501; group member 502; group member 504; group member 506; and group member 508. In time lapse environment 500a, group member 502, group member 504, group member 506, and group member 508 are meeting at meeting place 501 at a scheduled time, for example, 6:00 p.m. Time-radius $Rt_0$ 510 is a time-radius at a time, $t_0$. As time passes, time-radius $Rt_0$ 510 decreases as a function of time until it reduces to zero minutes at 6:00 p.m.

In time lapse environment 500a, a device locating sub-system defines a center as meeting place 501. At time $t_0$, the device locating sub-system defines a time-radius as time-radius $Rt_0$ 510. At time $t_0$, the travel time from group member 502 to meeting place 501 is travel time distance 512; the travel time from group member 504 to meeting place 501 is travel time distance 514; the travel time from group member 506 to meeting place 501 is travel time distance 516; the travel time from group member 508 to meeting place 501 is travel time distance 518. In time lapse environment 500a, at time $t_0$, each of group member 502, group member 504, group member 506, and group member 508 are within time-radius $Rt_0$ 510.

Figure 5B:
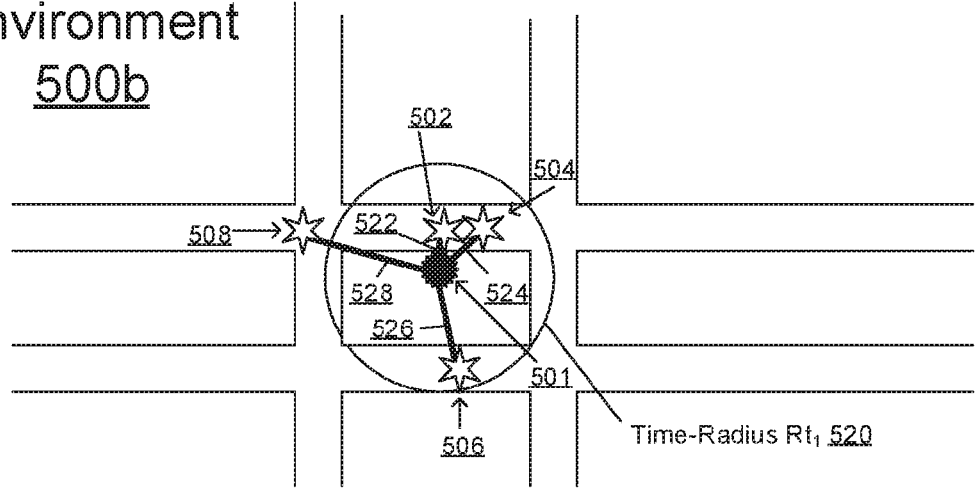

FIG. 5B depicts a screenshot of time lapse environment 500b. Time lapse environment 500b includes: meeting place 501; group member 502; group member 504; group member 506; and group member 508. In time lapse environment 500b, group member 502, group member 504, group member 506, and group member 508 have moved from their respective positions in time lapse environment 500a. Time lapse environment 500b shows the positions of group member 502, group member 504, group member 506, and group member 508 at a subsequent time, $t_1$. The device locating sub-system updates the time-radius, time-radius $Rt_1$ 520. At time $t_1$, the travel time from group member 502 to meeting place 501 is travel time distance 522; the travel time from group member 504 to meeting place 501 is travel time distance 524; the travel time from group member 506 to meeting place 501 is travel time distance 526; the travel time from group member 508 to meeting place 501 is travel time distance 528. The device locating sub-system monitors a set of movements for group member 502, group member 504, group member 506, and group member 508. The device locating sub-system determines that at time $t_1$ the travel time from group member 508 to meeting place 501 is greater than time-radius $Rt_1$ 520. Therefore, group member 508 is outside the time-circle, but group member 502, group member 504, and group member 506 are within time-radius $Rt_1$ 520.

Some embodiments of the present invention may include one, or more, of the following features, characteristics, and/or advantages: (i) providing location-based service to a set of group members; (ii) defining a time-circle with a time-radius characterized as a travel time instead of a linear distance; (iii) monitoring a set of movements of the set of group members; (iv) keeping the set of group members within the time-circle by alerting a group member who is outside the time-circle.

IV. Definitions

"Present invention" does not create an absolute indication and/or implication that the described subject matter is covered by the initial set of claims, as filed, by any as-amended set of claims drafted during prosecution, and/or by the final set of claims allowed through patent prosecution and included in the issued patent. The term "present invention" is used to assist in indicating a portion or multiple portions of the disclosure that might possibly include an advancement or multiple advancements over the state of the art. This understanding of the term "present invention" and the indications and/or implications thereof are tentative and provisional and are subject to change during the course of patent prosecution as relevant information is developed and as the claims may be amended.

"Embodiment," see the definition for "present invention."

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

A "set of" items means there exists one or more items; there must exist at least one item, but there can also be two, three, or more items. A "subset of" items means there exists one or more items within a grouping of items that contain a common characteristic.

A "plurality of" items means there exists at more than one item; there must exist at least two items, but there can also be three, four, or more items.

"Includes" and any variants (e.g., including, include, etc.) means, unless explicitly noted otherwise, "includes, but is not necessarily limited to."

A "user" or a "subscriber" includes, but is not necessarily limited to: (i) a single individual human; (ii) an artificial intelligence entity with sufficient intelligence to act in the place of a single individual human or more than one human; (iii) a business entity for which actions are being taken by a single individual human or more than one human; and/or (iv) a combination of any one or more related "users" or "subscribers" acting as a single "user" or "subscriber."

The terms "receive," "provide," "send," "input," "output," and "report" should not be taken to indicate or imply, unless otherwise explicitly specified: (i) any particular degree of directness with respect to the relationship between an object and a subject; and/or (ii) a presence or absence of a set of intermediate components, intermediate actions, and/or things interposed between an object and a subject.

A "module" is any set of hardware, firmware, and/or software that operatively works to do a function, without regard to whether the module is: (i) in a single local proximity; (ii) distributed over a wide area; (iii) in a single proximity within a larger piece of software code; (iv) located within a single piece of software code; (v) located in a single storage device, memory, or medium; (vi) mechanically connected; (vii) electrically connected; and/or (viii) connected in data communication. A "sub-module" is a "module" within a "module."

A "computer" is any device with significant data processing and/or machine readable instruction reading capabilities including, but not necessarily limited to: desktop computers; mainframe computers; laptop computers; field-programmable gate array (FPGA) based devices; smart phones; personal digital assistants (PDAs); body-mounted or inserted computers; embedded device style computers; and/or application-specific integrated circuit (ASIC) based devices.

"Electrically connected" means either indirectly electrically connected such that intervening elements are present or directly electrically connected. An "electrical connection" may include, but need not be limited to, elements such as capacitors, inductors, transformers, vacuum tubes, and the like.

"Mechanically connected" means either indirect mechanical connections made through intermediate components or direct mechanical connections. "Mechanically connected" includes rigid mechanical connections as well as mechanical connection that allows for relative motion between the mechanically connected components. "Mechanically connected" includes, but is not limited to: welded connections; solder connections; connections by fasteners (e.g., nails, bolts, screws, nuts, hook-and-loop fasteners, knots, rivets, quick-release connections, latches, and/or magnetic connections); force fit connections; friction fit connections; connections secured by engagement caused by gravitational forces; pivoting or rotatable connections; and/or slidable mechanical connections.

A "data communication" includes, but is not necessarily limited to, any sort of data communication scheme now known or to be developed in the future. "Data communications" include, but are not necessarily limited to: wireless communication; wired communication; and/or communication routes that have wireless and wired portions. A "data communication" is not necessarily limited to: (i) direct data communication; (ii) indirect data communication; and/or (iii) data communication where the format, packetization status, medium, encryption status, and/or protocol remains constant over the entire course of the data communication.

The phrase "without substantial human intervention" means a process that occurs automatically (often by operation of machine logic, such as software) with little or no human input. Some examples that involve "no substantial human intervention" include: (i) a computer is performing complex processing and a human switches the computer to an alternative power supply due to an outage of grid power so that processing continues uninterrupted; (ii) a computer is about to perform resource intensive processing and a human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

"Automatically" means "without any human intervention."

The term "real time" (and the adjective "real-time") includes any time frame of sufficiently short duration as to provide reasonable response time for information processing as described. Additionally, the term "real time" (and the adjective "real-time") includes what is commonly termed "near real time," generally any time frame of sufficiently short duration as to provide reasonable response time for on-demand information processing as described (e.g., within a portion of a second or within a few seconds). These terms, while difficult to precisely define, are well understood by those skilled in the art.

The term "time-circle" means an abstract shape with a radius characterized by a travel time from the circumference to the center. The abstract shape of the time-circle is not a circle on a linear plane, but is a circle on a plane defined by travel time (a time-radius).

The term "time-radius" means a radius of a time-circle characterized by a travel time, instead of a linear distance measurement. A "time-radius" is measured in units of time.

The term "travel time distance" means a distance characterized by a travel time, instead of a linear distance measurement. A "travel time distance" is measured in units of time.

What is claimed is:

1. A method comprising:
   identifying, by a set of processors, a set of group members;
   defining, by the set of processors, a center of a time-circle;
   selecting, by the set of processors, a fixed place as the center;
   defining, by the set of processors, a time-radius for the time-circle, characterized by a first travel time to the center;
   defining, by the set of processors, the time-radius as a function of time that decreases until the time-radius reduces to zero at the fixed place at a scheduled time;
   monitoring, by the set of processors, a first set of movements corresponding to the set of group members based, at least in part, on data received from portable computing devices that determine respective positions of the group members;
   updating, by the set of processors, the center based, at least in part, on the first set of movements;
   determining, by the set of processors, a first subset of the set of group members are outside the time-circle;
   generating, by the set of processors, an alert that identifies the first subset of group members; and
   communicating, by the set of processors, the alert, to a mobile computing device of a second subset of the set of group members, to indicate that the first subset of the set of group members is outside the time-circle.

2. The method of claim 1, wherein the first travel time is based, at least in part, on:
   a set of traveling speeds corresponding to the set of group members;
   a set of traveling directions corresponding to the set of group members;
   a set of geographic separations; and
   a set of traffic conditions.

3. The method of claim 1, further comprising:
   selecting, by the set of processors, a group leader from the set of group members; and
   defining, by the set of processors, a location of the group leader as the center;
   wherein:
      the center moves based, at least in part, on a movement in the first set of movements corresponding to the group leader.

4. The method of claim 3, further comprising:
   repeating, by the set of processors, the alert, to the second subset of the set of group members, at a first interval until the first subset of the set of group members reenters the time-circle;
   wherein:
      the second subset of the set of group members includes the group leader and the first subset of the set of group members.

5. The method of claim 1, wherein the center of the time-circle is defined as a central point among the set of group members based, at least in part, on a location distribution.

6. The method of claim 1, further comprising:
   determining, by the set of processors, a group member in the set of group members is outside the time-circle based, at least in part, on the time-radius being less than a second travel time from the group member to the center.

7. A computer program product comprising:
   a computer readable storage medium having stored thereon:
   first instructions executable by a device to cause the device to identify a set of group members based, at least in part, on data received from portable computing devices that determine respective positions of the group members;
   second instructions executable by a device to (i) cause the device to define a center of a time-circle and (ii) to cause the device to select a fixed place as the center;
   third instructions executable by a device to cause the device to (i) define a time-radius for the time-circle, characterized by a first travel time to the center, and (ii) to cause the device to define the time-radius as a function of time that decreases until the time-radius reduces to zero at the fixed place at a scheduled time;
   fourth instructions executable by a device to cause the device to monitor a first set of movements corresponding to the set of group members;
   fifth instructions executable by a device to cause the device to update the center based, at least in part, on the first set of movements;
   sixth instructions executable by a device to cause the device to determine a first subset of the set of group members are outside the time-circle; and
   seventh instructions executable by a device to cause the device to (i) generate an alert that identifies the first subset of group members and (ii) communicate the alert, to a mobile computing device of a second subset of the set of group members, to indicate that the first subset of the set of group members are outside the time-circle.

8. The computer program product of claim 7, wherein the first travel time is based, at least in part, on:
   a set of traveling speeds corresponding to the set of group members;
   a set of traveling directions corresponding to the set of group members;
   a set of geographic separations; and
   a set of traffic conditions.

9. The computer program product of claim 7, further comprising:
   eighth instructions executable by a device to cause the device to select a group leader from the set of group members; and
   ninth instructions executable by a device to cause the device to define a location of the group leader as the center;
   wherein:
      the center moves based, at least in part, on a movement in the first set of movements corresponding to the group leader.

10. The computer program product of claim 9, further comprising:
    tenth instructions executable by a device to cause the device to repeat the alert, to the second subset of the set of group members, at a first interval until the first subset of the set of group members reenter the time-circle;
    wherein:
       the second subset of the set of group members includes the group leader and the first subset of the set of group members.

11. The computer program product of claim 7, wherein the center of the time-circle is defined as a central point among the set of group members based, at least in part, on a location distribution.

12. The computer program product of claim 7, further comprising:
    eleventh instructions executable by a device to cause the device to determine a group member in the set of group member is outside the time-circle based, at least in part, on the time-radius being less than a second travel time from the group member to the center.

13. A computer system comprising:
    a processor set; and
    a computer readable storage medium;
    wherein:
       the processor set is structured, located, connected, and/or programmed to execute instructions stored on the computer readable storage medium; and
       the instructions include:
          first instructions executable by a device to cause the device to identify a set of group members based, at least in part, on data received from portable computing devices that determine respective positions of the group members;
          second instructions executable by a device to (i) cause the device to define a center of a time-circle and (ii) to cause the device to select a fixed place as the center;
          third instructions executable by a device to cause the device to (i) define a time-radius for the time-circle, characterized by a first travel time to the center, and (ii) to cause the device to define the time-radius as a function of time that decreases until the time-radius reduces to zero at the fixed place at a scheduled time;
          fourth instructions executable by a device to cause the device to monitor a first set of movements corresponding to the set of group members;
          fifth instructions executable by a device to cause the device to update the center based, at least in part, on the first set of movements;
          sixth instructions executable by a device to cause the device to determine a first subset of the set of group members are outside the time-circle; and
          seventh instructions executable by a device to cause the device to (i) generate an alert that identifies the first subset of group members and (ii) communicate the alert, to a mobile computing device of a second subset of the set of group members, to indicate that the first subset of the set of group members are outside the time-circle.

14. The computer system of claim 13, wherein the first travel time is based, at least in part, on:
    a set of traveling speeds corresponding to the set of group members;
    a set of traveling directions corresponding to the set of group members;
    a set of geographic separations; and
    a set of traffic conditions.

15. The computer system of claim 13, further comprising:
    eighth instructions executable by a device to cause the device to select a group leader from the set of group members; and
    ninth instructions executable by a device to cause the device to define a location of the group leader as the center;
    wherein:
       the center moves based, at least in part, on a movement in the first set of movements corresponding to the group leader.

16. The computer system of claim 13, wherein the center of the time-circle is defined as a central point among the set of group members based, at least in part, on a location distribution.

17. The computer system of claim 13, further comprising:
    tenth instructions executable by a device to cause the device to determine a group member in the set of group members is outside the time-circle based, at least in part, on the time-radius being less than a second travel time from the group member to the center.

* * * * *